United States Patent [19]
Axberg

[11] Patent Number: 4,766,604
[45] Date of Patent: Aug. 23, 1988

[54] METHOD FOR RECEIVING AND DELIVERING VOICE MESSAGES

[75] Inventor: David R. Axberg, Carrollton, Tex.

[73] Assignee: MessagePhone, Inc., Dallas, Tex.

[21] Appl. No.: 928,534

[22] Filed: Nov. 7, 1986

[51] Int. Cl.$^4$ .......................... H04M 1/66; H04M 3/50
[52] U.S. Cl. ........................................ 379/67; 379/69; 379/84; 379/197; 379/198
[58] Field of Search ...................... 379/84, 88, 89, 214, 379/67, 145, 211, 212, 213, 196, 197, 198, 69

[56] References Cited

U.S. PATENT DOCUMENTS

| | | | |
|---|---|---|---|
| 3,728,486 | 4/1973 | Kraus | 379/69 |
| 3,952,160 | 4/1976 | Pasternack et al. | 379/145 |
| 4,123,623 | 10/1978 | McElliott | 379/33 |
| 4,206,321 | 6/1980 | McElliott | 379/33 |
| 4,221,933 | 9/1980 | Cornell et al. | 379/84 |
| 4,263,482 | 4/1981 | Serres et al. | 379/113 |
| 4,371,752 | 2/1983 | Matthews et al. | 379/89 |
| 4,375,083 | 2/1983 | Maxemchuk | 379/88 X |
| 4,404,433 | 9/1983 | Wheeler et al. | 379/112 |
| 4,406,925 | 9/1983 | Jordon et al. | 379/93 |
| 4,410,765 | 10/1983 | Hestad et al. | 379/112 |
| 4,417,101 | 11/1983 | Serres et al. | 379/131 |
| 4,523,055 | 6/1985 | Hohl et al. | 379/89 |
| 4,549,047 | 10/1985 | Brian et al. | 379/88 |
| 4,600,809 | 7/1986 | Tatsumi et al. | 379/88 |
| 4,602,129 | 7/1986 | Matthews et al. | 379/84 |
| 4,625,081 | 11/1986 | Lotito et al. | 379/196 |
| 4,674,116 | 6/1987 | Curtin et al. | 379/211 |

FOREIGN PATENT DOCUMENTS 2575016  6/1986  France ................................. 379/88

OTHER PUBLICATIONS

IBM Technical Disclosure Bulletin, "Unanswered Call Diverter", Brady et al., Dec. 1982, vol. 25, No. 7A, pp. 3480, 3481.

Primary Examiner—Thomas W. Brown
Attorney, Agent, or Firm—David H. Judson

[57] ABSTRACT

A method for receiving and delivering voice messages responds to the inability of a caller to complete a call from a calling station to a called station to automatically cause the calling station to default to a voice message center. If the caller desires to leave a voice message to be delivered to the called station, the caller is prompted to store the voice message. Thereafter, the voice message center initiates an outdial routine which makes a predetermined number of attempts to deliver the voice message to the called station at predetermined time intervals. In the preferred embodiment, the method is incorporated in a multiple user station telephone system in either a "shared tenant services" or "on-campus" configuration.

4 Claims, 4 Drawing Sheets

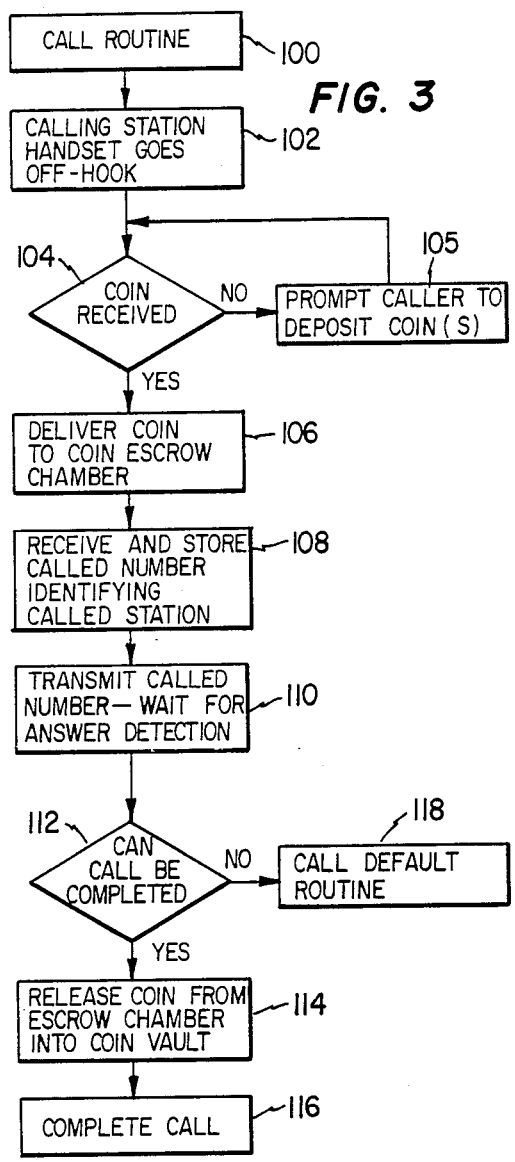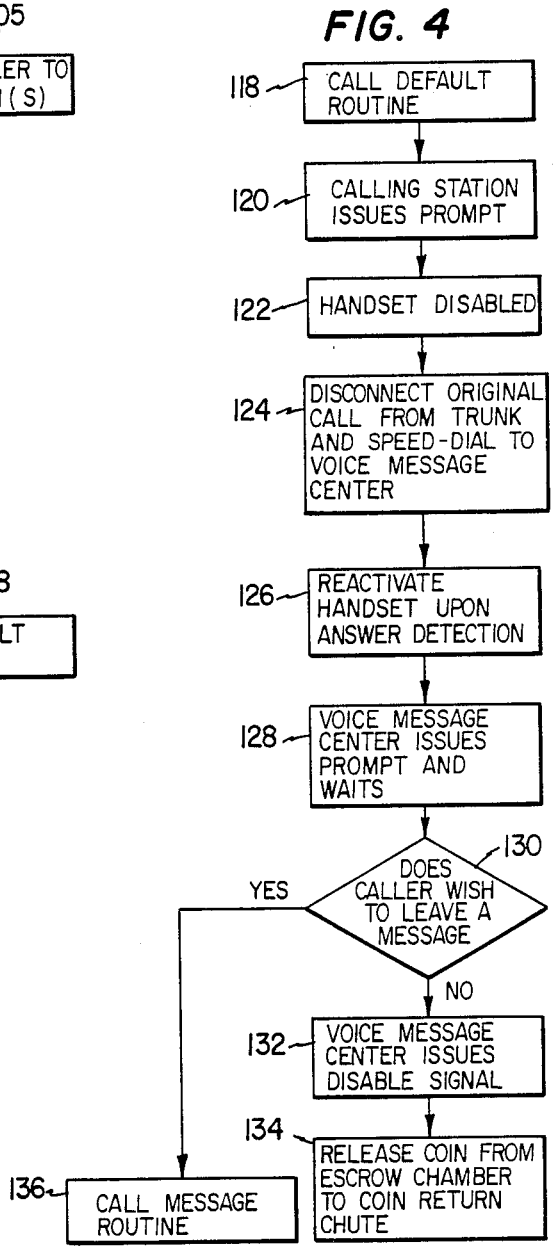

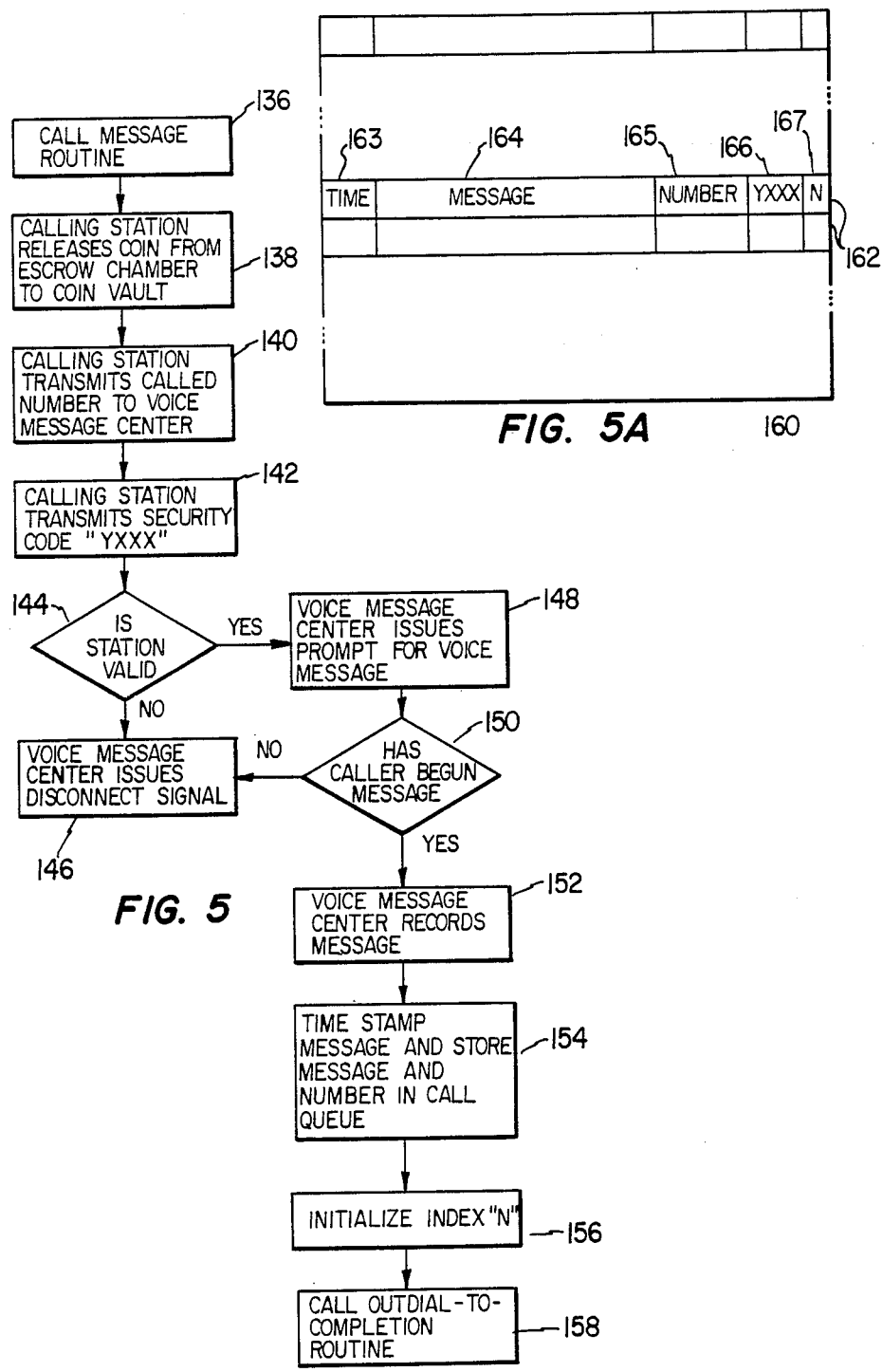

METHOD FOR RECEIVING AND DELIVERING VOICE MESSAGES

TECHNICAL FIELD

The present invention relates to telecommunications and particularly to a telephone system having the capability to receive and deliver voice messages.

BACKGROUND OF THE INVENTION

It is known in the art to operate a multiple paystation telephone installation from a central office. In such systems, the central office typically performs the coin collect, return and verification functions necessary to provide both local and long distance services. Each paystation of the system may also be connected through the central office to a so-called "auto attendant." The auto attendant accept a message from the paystation and delivers the message to a specific destination. The auto attendant, however, cannot provide such enhancements as "voice mail" because this device does not have the capability to record and store messages.

Multiple paystation installations of the type described above have recently been enhanced through the use of so-called "smart" paystations. Such paystations typically include their own microprocessor and associate memory for supporting various computer programs. These programs provide several desirable operating features, e.g., loop start dialtone and "least cost routing" for long distance telephone calls. Although "smart" paystations are advantageous, such devices have yet to be successfully integrated into auto attendant or conventional voice message systems. Paystation operators have therefore been unable to offer message transfer, voice messaging or other enhancements to users of their paystations.

BRIEF SUMMARY OF THE INVENTION

The limitations of prior art multiple user station telephone installations are overcome by the method of the present invention wherein a caller at a calling station may leave a voice message at a voice message center if the caller is unable to complete a call to a called station. After the voice message is received at the voice message center, the voice message center attempts to deliver the message to the called station at predetermined time intervals until a predetermined number of attempts to deliver the message have been made.

According to a preferred embodiment of the method, a called number identifying the called station is received and stored at the calling station at the call initiation. The called number is then transmitted from the calling station to establish a link to the called station. If the call to the called station can be completed, the telephone link is established between the calling and called stations in a normal fashion. If the call to the called station cannot be completed, however, the method defaults to a "call default" routine which determines whether the caller desires to record a voice message for the called station. Generally, a call cannot be completed if the called station is busy or if the called station remains on-hook for a predetermined number of rings following call initiation.

If the caller desires to record a voice message, the voice message and the called number are stored in the voice message center located between the calling and called stations. At a predetermined time interval, a determination is made whether the recorded voice message can then be delivered to the called station. If so, i.e., if the called station is no longer busy or goes off-hook within a predetermined number of rings, the recorded voice message is transmitted to the called station. If the recorded voice message cannot be delivered, subsequent attempts are made to forward the message at the predetermined time interval. The process is repeated until the message has been transmitted to the called station or until a predetermined number of unsuccessful attempts to deliver the recorded voice message have been made.

Preferably, recorded messages are stored in a call queue in the voice message center. In particular, each received message is "time-stamped" and stored in the call queue at an address uniquely associated with the time that the message was recorded. At the predetermined time interval, the message is retrieved from the call queue. If an access port in the voice message center is available, an attempt is then made to reach the original called station. If no access port is available, the message is placed in a subqueue with any other messages waiting to be delivered at that time. Messages are stored in the subqueue on a priority basis according to the order in which the messages were originally received by the voice message center. When an access port is available, the voice message center first attempts to deliver each "backed-up" message in the subqueue before attempting to deliver any other message from the call queue.

The preferred method for receiving and delivering voice messages also includes several "security" features. When the method is incorporated into a multiple user station telephone system, each station includes appropriate means for disabling a handset thereof at the initiation of the call default routine. This operation advantageously prevents illegal access to the voice message center. Moreover, the voice message center will not allow the recording of a voice message until the center first verifies that the calling station is "valid." In particular, each calling station must transmit a unique security code to the voice message center prior to the recording of the voice message. If the security code is not recognized by the message center, the calling station is immediately disconnected.

BRIEF DESCRIPTION OF THE DRAWINGS

For a more completed understanding of the present invention and the advantages thereof, reference is now made to the following Description taken in conjunction with the accompanying drawings in which:

FIG. 3 is a detailed flowchart diagram of a call routine of the invention for determining whether a call can be completed from a calling station to a called station;

FIG. 4 is a detailed flowchart diagram of a call default routine of FIG. 3 for determining whether a caller desires to leave a voice message to be delivered to the called station;

FIG. 5 is a detailed flowchart diagram of a call message routine of FIG. 4 for storing the voice message to be delivered to the called station;

FIG. 5A is a representation of a call queue of the voice message center used to store recorded voice messages.

DETAILED DESCRIPTION

Figure 1:
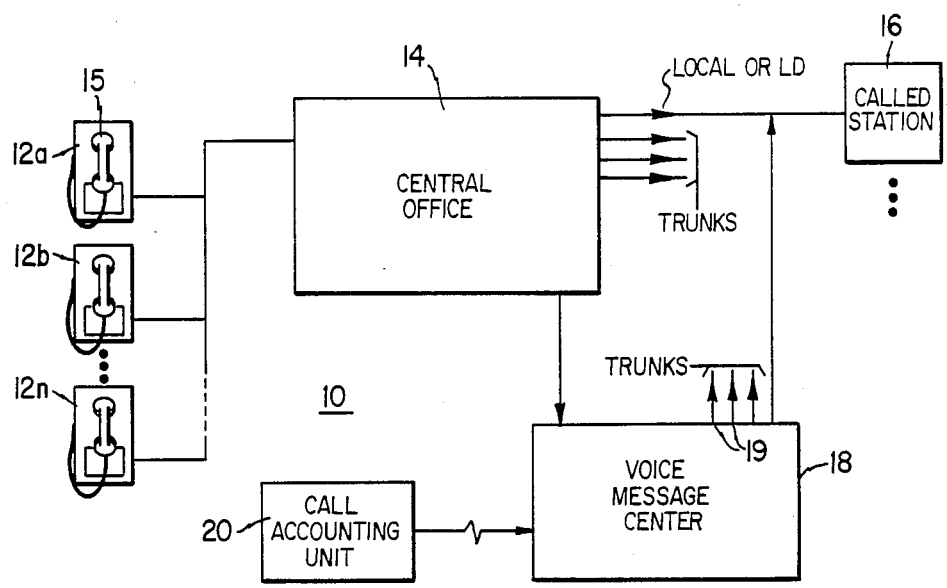
FIG. 1 is a block diagram of a multiple user station telephone system having a privately owned central office and a voice message center.

With reference now to the drawings wherein like reference characters designate like parts or steps throughout the several views, FIG. 1 is a block diagram of a multiple user station telephone system 10 in which the method of the present invention is used. System 10 includes a plurality of user stations 12a–12n connected to a privately owned central office 14. Such a configuration is typically referred to as an "on-campus" configurations. Each of the user stations 12a–12n is preferably a "pre-pay" paystation, such as a Model 6500ST manufactured by Digitronics Mfg. Corp., and thus includes a suitable microprocessor and associated memory device (e.g., a programmable read only memory or "PROM") for storing computer programs which control the operation of the paystation. Each paystation also includes a conventional handset 15 as well as other standard components (not shown) normally associated with the coin collection process.

To initiate a call from one of the paystations 12a–12n, a caller removes the handset 15 and enters a called number. This number identifies a called station 16 which may be either a local or a long distance station. As also seen in FIG. 1, the multiple paystation system 10 includes a voice message center 18 for recording voice messages from the user stations 12a–12n. Voice message center 18 has a plurality of access ports 19 from which recorded voice messages are output. Although not meant to be limiting, voice message center 18 may be a Model M/1000 Voice Message Relay System manufactured by Message Processing Systems, Inc. The system 10 also includes a call accounting unit 20 connected to the voice message center 18 for the purposes to be described.

Figure 2:
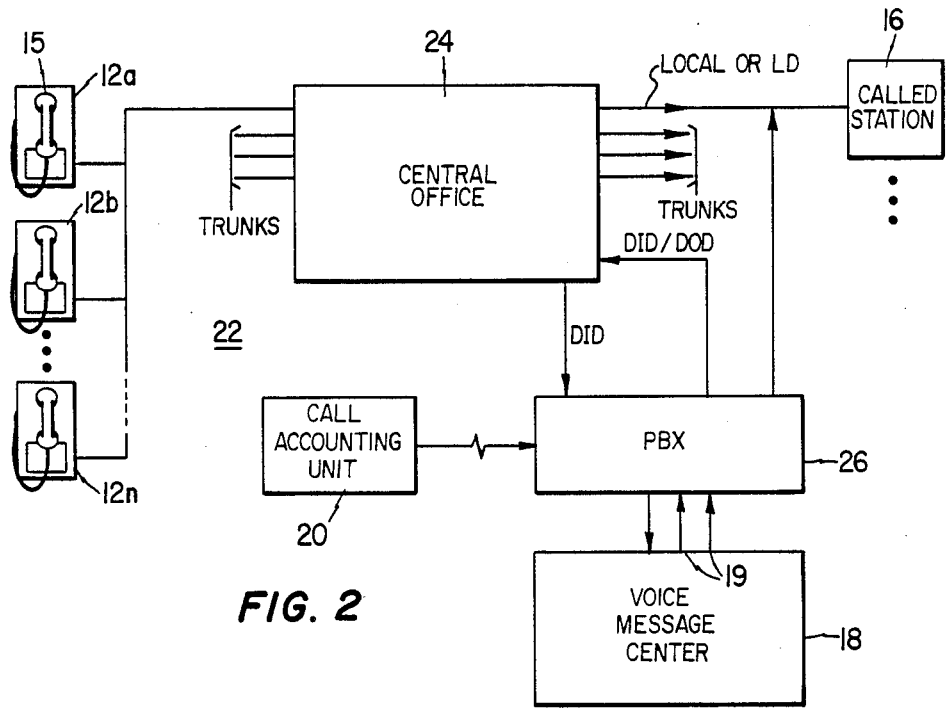
FIG. 2 is a block diagram of another multiple user station telephone system having a conventional central officer and a private branch exchange (PBX) connecting the multiple user stations to the voice message center.

Referring now to FIG. 2, a block diagram is shown of another multiple user station system 22 for use with the method of the present invention. System 22 includes a conventional central office 24 and a private branch exchange ("PBX") 26 connecting the multiple user stations 12a–12n to the voice message center 18 of the system 22. FIG. 2 is therefore a so-called "on-premises" configuration in which each station has a direct inward dial ("DID") connection to the PBX 26. The "on-premises" configuration is used to provide enhanced subscriber features such as shared tenant services ("STS"). As seen in FIG. 2, the multiple user station system 22 also incudes a call accounting unit 20 connected to the PBX 26.

Multiple user station systems such as shown in FIGS. 1 and 2 are enhanced by the method for receiving and delivering voice messages of the present invention. Although the system configurations of FIGS. 1 and 2 are preferred, they are not meant to be limiting. Generally, the method exploits the inability of a calling station 12a–12n to complete a call to the called station 16 to automatically cause the calling station to default to the voice message center 18. If the caller desires to leave voice message to be delivered to the called station 16, the caller is thereafter prompted to store the voice message. The voice message center 18 then initiates an outdial routine which makes a predetermined number of attempts to deliver the voice message to the called station. Each of these attempts are made at a predetermined time interval which may be programmed by the system operator.

Referring now to FIG. 3, a flowchart diagram is shown detailing a call routine 100 of the method for receiving and delivering voice messages according to the present invention. The call routine 100 begins at step 102 when the calling station handset 15 goes off-hook. As described above, each calling station 12a–12n is preferably a "pre-pay" paystation which requires receipt of appropriate coinage before a call can be placed. Accordingly, at step 104, an inquiry is made to determine whether a coin has been received. If not, the method continues at step 105 to request that the caller deposit the appropriate coinage for the call. Upon receipt of the coinage, the method continues at step 106 to deliver the coin to a conventional coin escrow chamber of the calling station.

At step 108, the method receives and stores the called number identifying the called station 16. At step 110, the called number is transmitted over the trunk and the calling station waits for an answer detection (i.e., the called station goes off-hook). The method continues at step 112, where an inquiry is made to determine whether the call can be completed. In particular, step 112 preferably determines whether answer detection occurs within a predetermined number of rings or whether the called station is busy. If the call can be completed, the method continues at step 114 to release the coin from the coin escrow chamber into the coin vault of the calling station. At step 116, the call is completed in a normal fashion. If the result of the inquiry at step 112 indicates that answer detection has not occurred (i.e., the called station remains on-hook) within the predetermined number of rings following call initiation or that the called station is busy, the method initiates a "call default" routine 118 for determining whether the caller at the calling station desires to leave a voice message to be delivered to the called station.

Referring now to FIG. 4, a detailed flowchart diagram is shown of the call default routine 118 of FIG. 3. The routine begins at step 120 wherein the calling station issues a prompt to the caller such as "Please Wait." A bilingual prompt may also be issued at step 120 if desired. At step 122, the handset of the calling station is disabled for the reasons described below. The call default routine 118 continues at step 124 wherein the original call is disconnected from the trunk and a "speed-dial" is initiated to the voice message center 18. The muting of the handset at step 122 is therefore advantageous because step 124 disconnects the original call from the trunk. If the handset were not muted, the caller would otherwise hear a dial tone and the voice message center 18 could be accessed via a "black box" or other illegal means.

The call default routine 118 continues at step 126 with the handset of the calling station reactivated upon answer detection (i.e., voice message center 18 going off-hook). At step 128, the voice message center issues a prompt to the caller and waits for an appropriate response. Although not meant to be limiting, the following prompt may be issued at step 128:

"This is a voice message center. Your party is not available at this time. If you would like to leave a 20 second message at no additional charge, press the "#" key and I will attempt to deliver your message every 15 minutes for the next two hours. If you do not wish to leave a message, hang up, and I will return your money."

The call default routine 118 continues at step 130 to determine whether the caller desires to leave a voice message for the called station. In operation, step 130 simply waits for reception of a signal identifying the "#" key within a set period of time, e.g., 15 seconds. If the timer at step 130 times out (indicating that the caller does not wish to leave a voice message) the call default routine 118 continues at step 132 with the voice message center 18 sending a "disable" signal to the calling station. At step 134, the coin located in the coin escrow chamber is released to a coin return chute of the calling station and the call is terminated. If the result of the inquiry 130 is positive, the method continues by calling a "call message" routine 136 for storing the voice message to be delivered to the called station.

Referring now to FIG. 5, a detailed flowchart diagram is shown of the call message routine 136 of FIG. 4. The routine begins at step 138 wherein the calling station releases the coin from the coin escrow chamber into the coin vault of the calling station. At step 140, the calling station transmits the called number to the voice message center 18. The call message routine 136 continues at step 142 wherein the calling station transmits a four digit security code "YXXX" to ensure that the calling station is entitled to transmit messages to the voice message center. Preferably, the first digit "Y" of the security code is a DTMF (dual tone multifrequency) combination of a dialtone and the "#" key. The remaining three digits "XXX" of the security code are preferably a number which uniquely identifies the calling station.

At step 144, the received security code is evaluated to determine whether the calling station is entitled to transmit messages to the voice message center 18. If the calling station is invalid, the call message routine 136 issues a disconnect signal to the calling station at step 146, thereby disconnecting the calling station from the voice message center 18. If the result of the inquiry 144 indicates that the calling station is valid, the voice message center 18 issues a prompt at step 148 to request that the caller begin the message. For example, the prompt at step 148 may state:

"Please state your name and your 20 second message now."

At step 150, an inquiry is made to determine whether the caller has begun recording the message within a predetermined time, e.g., 5 seconds. If the caller has not begun recording the message within the predetermined time, the call message routine 136 issues a salutation and then issues a disconnect signal at step 146.

If the result of the inquiry at step 150 is positive, the voice message center 18 records the spoken message at step 152. At step 154, the call message routine 136 time-stamps the message and stores the message and the called number transmitted at step 140 in a call queue. As used herein, the phrase "time-stamps" means that the message and the called number are placed in the call queue (i.e., a suitable memory device of the voice message center) at an address uniquely associated with the time that the caller began recording the message. At step 156, an index "N" for the message is initialized. The index "N" represents a number of outdial attempts to be performed by the voice message center 18 as will be described. The call message routine 136 terminates at step 158 by calling an "outdial-to-completion" routine which is used to attempt delivery of the stored voice message to the called station.

Referring briefly to FIG. 5A, a representation is shown of the call queue 160 of the voice message center. Call queue 160 has a plurality of rows 162, each of which correspond to a recorded voice message. Each row 162 preferably has an address field 163 for storing the time at which the message was begun, a message field 164 for storing the message, a called number field 165 for storing the called number, a validation field 166 for storing the four digit security code "YXXX," and an attempt field 167 for storing the attempt index "N."

Figure 6:
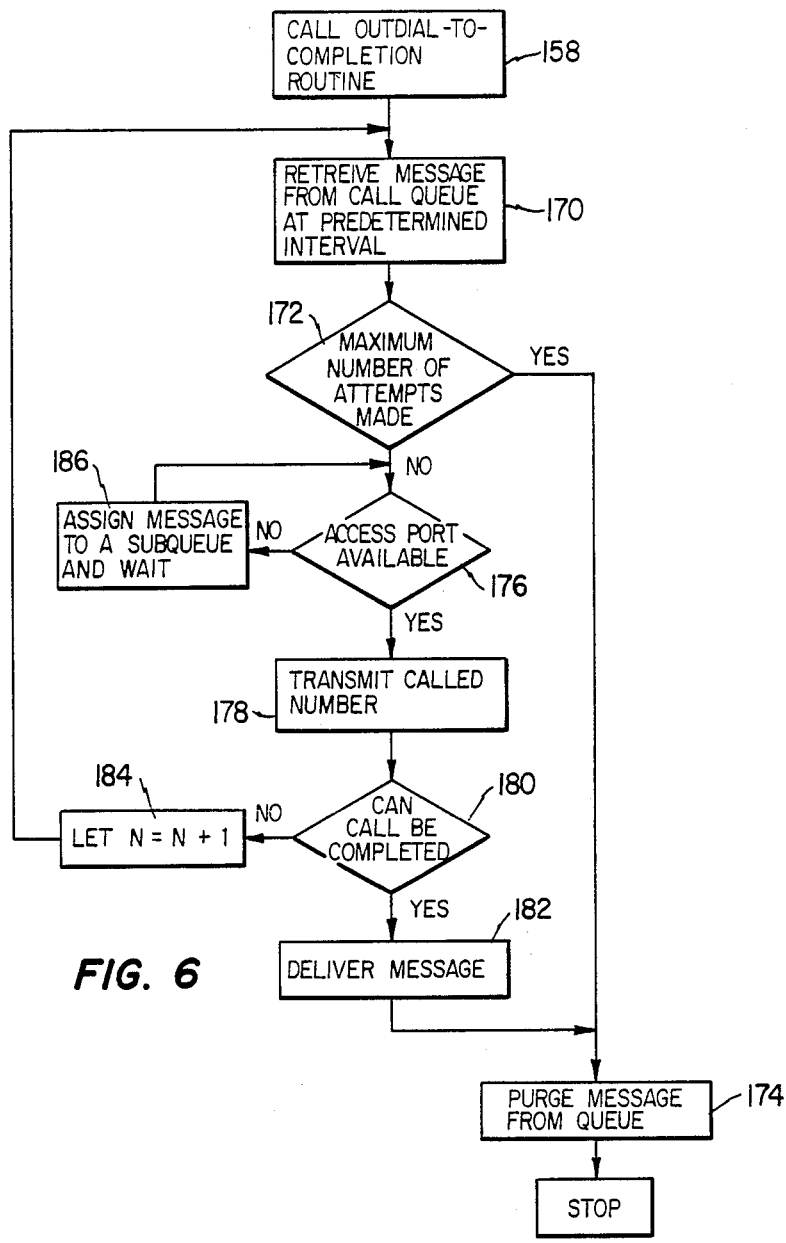
FIG. 6 is a detailed flowchart diagram of an outdial-to-completion routine of FIG. 5 used to attempt delivery of the stored voice message to the called station.

Referring now to FIG. 6, a detailed flowchart diagram is shown of the outdial-to-completion routine 158 of FIG. 5. The routine begins at step 170 wherein the message stored at step 154 is retrieved from the call queue 160. In the preferred embodiment, each message is retrieved every 15 minutes, although other predetermined intervals may be programmed by the system operator. The outdial-to-completion routine 158 continues at step 172 wherein an inquiry is made to determine whether the index "N" is at a predetermined maximum value. As described, the index "N" represents a number of outdial attempts made by the message center to transmit the stored voice message to the called station. If the index "N" equals the maximum value (indicating that a maximum number of unsuccessful attempts to deliver the message have been made), the routine 158 purges the message from the call queue at step 174 and the method terminates.

If the result of the inquiry at step 172 is negative, the routine 158 continues at step 176 to determine whether the voice message center 18 has an available access port 19 for delivery of the voice message. If an access port 19 is available, the voice message center 18 transmits the called number over an appropriate trunk at step 178. At step 180, an inquiry is made to determine whether the voice message can be delivered to the called station. Step 180 is preferably identical to step 112 as described above with respect to FIG. 3. If the call can be completed, the outdial-to-completion routine 158 continues at step 182 to deliver the message to the called party. The delivered message is then purged from the call queue 160 at step 174 and the method terminates. If the result of the inquiry at step 180 is negative, the index "N" is incremented at step 184, indicating that an attempt to deliver the message has been unsuccessful, and the routine 158 returns to step 170.

If the result of the inquiry at step 176 is negative, i.e., and access port 19 from the voice message center 18 is unavailable, the outdial-to-completion routine 158 assigns the voice message (any other voice messages to be delivered) to a subqueue of the message center and waits for an available access port 19 at step 186. Preferably, the subqueue has a structure similar to the call queue 160 of FIG. 5A. Each "backed-up" message is assigned to a subqueue in sequential order depending on when the message was originally received by the voice message cener. Upon the availability of an access port 19, the messages in the subqueue are sequentially delivered to the available access port and the method continues at step 178 as described above. The voice message center thus first attempts to deliver each "backed-up" message in the subqueue before attempting to deliver any other message from the call queue 160.

According to another feature of the invention, the call accounting unit 20 is provided to monitor the voice message activity from the calling stations 12a–12n. Call accounting unit 20 is preferably an IBM/AT personal computer which is connected via modem to the voice message center 18 in FIG. 1 or to the PBX 26 in FIG. 2. The accounting unit 20 is programmed by the system operator to record such data as (a) how many messages were sent to the center 18 by each paystation, (b) how many attempts were made by the center to contact the called station for each such message and (c) the identification of each such called station. Such accounting functions are not meant to be limiting.

Accordingly, the present invention describes a method wherein the inability to complete a call from a calling station to a called station automatically causes the calling station to default to a voice message center. If the caller desires to leave a voice message to be delivered to the called station, the caller is prompted to store the voice message. Thereafter, the voice message center initiates an outdial routine which makes a predetermined number of attempts to deliver the voice message to the called station at predetermined time intervals.

Preferably, the method described in FIGS. 3-6 is carried out by a computer program stored in each paystation 12a–12n and a computer program stored at the voice message center 18. Each such program operates with the respective processing unit in the paystation or voice message center in a conventional manner to produce the above-described functions. Moreover, it should be appreciated that the described method is not limited for use with paystations as the "calling" stations. In the preferred embodiment, the following computer programs may be used to control the method:

```
              MESSAGER/1000 PAY STATION INTERFACE SOFTWARE
                         CODE WRITTEN IN: "C"
                      PAY STATION: DIGITRONICS 6500 ST
************************ SOURCE CODE ****************************
================================================================
mpi:    mvi     A,1f    ! mask all restarts
        sim
        mvi     A,30    ! turn earpiece
        out     RELAY
        call    tendly  ! subroutine (c) 1986 DIGITRONICS
        mvi     A,0B0   ! 0B0=ear off, off hook, no d.t.,mouth off
        out     RELAY   ! relay, off hook to ext. line mcallit:
        sub     A       ! init timeout to 0
        lxi     H,tick
        mov     M,A mdilton:
        call    wdog    ! subroutine (c) 1986 DIGITRONICS
        in      COIN    ! look at call progress chip
        ani     1
        cpi     1       ! tone ?
        jz      mgotit  ! yes! count valid time
        in      COIN    ! look at switch
        ani     4
        cpi     0
        jz      off     ! hang up
        push    H
        pop     H
        mov     A,M     ! get TICK
        dai     1       ! tick timer
        mov     M,A     ! replace update TICK
        jc      off     ! if carry out, timeout in 25 secs
        call    sixdly  ! subroutine (c) 1986 DIGITRONICS
        call    sixdly  ! subroutine (c) 1986 DIGITRONICS
        jmp     mdilton! continue to wait ...

mgotit:
        call    wdog    ! subroutine (c) DIGITRONICS
        sub     A
        mov     M,A     ! put 0 to TICK again mmg1:
        call    wdog    ! subroutine (c) 1986 DIGITRONICS
        in      COIN    ! get call progress
        ani     1
        cpi     1       ! still got dial tone
        jnz     mcallit! no - go back and wait again
        call    sixdly  ! subroutine (c) 1986 DIGITRONICS
        mov     A,M     ! get TICK
        inr     A
        cpi     10      ! 16 ticks with dail tone?
        mov     M,A     ! no - put tick back and loop
        jnz     mmg1
```

```
        lda     PBX      ! look at 1st digit of PBX string
        cpi     0
        jz      mdodo
        lxi     H,PBX    ! point to PBX prefix string
        lda     PFLG     ! use tone or pluse as defined by PFLG
        sta     TEMP     ! flag for dilout
        call    dilout   ! subroutine (c) 1986 DIGITRONICS
        lxi     H,TICK mdilout:
        call    wdog     ! subroutine (c) 1986 DIGITRONICS
        in      COIN     ! look at call progress chip
        ani     1
        cpi     1        ! tone?
        jz      mgoti    ! yes! count vaild time
        ani     4
        cpi     0
        jz      off      ! hang up
        push    H
        pop     H
        mov     A,M      ! get TICK
        adi     1        ! tick timer
        mov     M,A      ! replace update TICK
        jc      off      ! if carry out, timout in 25 secs
        call    sixdly   ! subroutine (c) 1986 DIGITRONICS
        call    sixdly   ! subroutine (c) 1986 DIGITRONICS
        jmp     mdilout  ! coutinue to wait ...

mgoti:
        call    wdog     ! subroutine (c) 1986 DIGITRONICS
        sub     A
        mov     M,A      ! put 0 to TICK again mg2:
        call    wdog     ! subroutine (c) 1986 DIGITRONICS
        in      COIN     ! get call progress
        ani     1
        cpi     1        ! still got dial tone
        jnz     mdilto   ! no - go back and wait again
        call    sixdly   ! subroutine (c) 1986 DIGITRONICS
        mov     A,M      ! get TICK
        inr     A
        cpi     10       ! 18 ticks with dial tone?
        mov     M,A      ! no - put tick back and loop ...
        jnz     mg2      !

mdodo:
        call    wdog     ! subroutine (c) 1986 DIGITRONICS
        lxi     H,MNUM   ! point to user dialled string
        lda     PFLG     ! use pluse/tone dial flag
        sta     TEMP
        call    dilout   ! subroutine (c) 1986 DIGITRONICS
        mvi     A,0F0    ! 0F2=ear on, off hook, no d.t.,mouth on
        out     RELAY
        mvi     D,20     ! "please"
        call    sayit    ! subroutine (c) 1986 DIGITRONICS
        mvi     D,24     ! "wait"
        call    sayit    ! subroutine (c) 1986 DIGITRONICS
        mvi     A,0B0    ! ear off, mouth off, off hook, no d.t.
        out     RELAY mtlp:
        call    wdog     ! subroutine (c) 1986 DIGITRONICS
        in      DTMF     ! get DTMF receiver
        ani     10
        cpi     10       ! check strobe
        jz      mans     ! yes - VMRS answered
        in      COIN
        ani     4
        cpi     0
        jz      off      ! yes - go on hook
        jmp     mtlp mans:
        mvi     A,0F2    ! 0F2=ear on, off hook, no d.t.,mouth on
        out     RELAY
        call    wdog     ! subroutine (c) 1986 DIGITRONICS
        in      COIN     ! check for on hook from user
        ani     4
```

```
        cpi    0
        jz     off     ! hang up ...
        in     KPAD    ! examine keypad
        ani    07F     ! mask self test jumper
        cpi    48      ! "#" key?
        jz     fwd
        in     DTMF    ! get DTMF receiver
        ani    1F
        cpi    1B      ! check for "*" from VMRS
        jz     off     ! yes - VMRS timed out, disconnect
        jmp    mans
        out    RELAY
        call   wdog    ! subroutine (c) 1986 DIGITRONICS
        lxi    H,NUMBUF ! point to user dialled string
        sub    A       ! force tone to VMRS
        sta    TEMP
        call   dilout  ! subroutine (c) 1986 DIGITRONICS
        mvi    A,0F2   ! turn coil off
        out    RELAY   ! leave mouth,ear,line on
mtalklp:
        call   wdog    ! subroutine (c) 1986 DIGITRONICS
        in     COIN    ! look at hookswitch
        ani    4
        cpi    0
        jz     off
        in     DTMR    ! get DTMR receiver
        sta    TEMP
        ani    10
        cpi    10      ! strobe active?
        jnz    mtalklp
        lda    TEMP
        ani    0f      ! mask all but vaild DTMF's
        cpi    0B      ! "*" ?
        jz     off
        jmp    mtalklp
```

/*

PROGRAM NAME: MPI.C

MESSAGE PROCESSING SYSTEMS, INC.
CHARLOTTE, NC.

DATE: JUNE 18, 1986

This is the main program for the MESSAGE PHONE, INC. pay telephone voice
message routine. Also included are the specialized functions required to
perform this routine.

*/ include "define.c"

main()

{ unsigned int i,j,trys,m,b,c,t;

char d,r;

onhook();                              /* hang up phone line*/ outpt(LEDOUT,0);                       /* turn off indicator lights */ modminit();                            /* initialize the modem */ resdelay(2);                           /* wait 2 seconds */ while(timeout()==FALSE)
    {;} mpiinit();                             /* initialize the system for mpi routine */ datetime(&date[0],&time[0]);           /* date and time from the realtime clock */ ldpmtset(1);                           /* pre-load the prompt set */

```
while(1)                               /* begin mpi routine. do till power down */
{

/* wait for an incomming call */ do
    {
        onhook();                       /* hangup the phone line */ chkrboot();                     /* check if reboot requested */ rstspace(&sdmsg.dial[0],32);    /* clear the dial string */ answer(1,30);                   /* wait 30 secs. for a call */ if(connect==FALSE)              /* if no call came in*/
            deliver(8,15);    /* attempt to deliver messages up to 8 times, at
                                 15 minute intervals */

}while(connect==FALSE);             /* do till call comes in */ rstspace(&valid[0],15);             /* set to receive command tone */
    valid[0]='#';
    valid[1]='*';
    m=0;                                /* set message flag off */ d=ask(901,2,5);                     /* say system greeting. get one digit.
                                           repeat prompt twice. wait 5 seconds
                                           before repeating*/ if(d==0 || d=='*')   /* if nothing or star was dialed, terminate the call */
    {
        m=0;
        goto bye;
    } say('P',902,YES);                   /* say "thank you"*/ dial('#');                          /* signal phone to send digits */ allvalid();                         /* accept any digit*/ rstspace(&sdmsg.dial[0],32);        /* clear the dial string array */

/* receive dial string from phone. Put into dial string array.
       No prompt. Wait 3 seconds.*/ getdigts(11,&sdmsg.dial[1],0,0,3);

i=0;

if(sdmsg.dial[1]==' ')              /* if no phone number was dialed */
        goto bye;

if(sdmsg.dial[1]=='9')              /* if maintenance code dialed */
        for(i=2; i<5 && sdmsg.dial[i]=='9'; i++)
        {;} if(i==5)
        goto end;                       /* enable modem auto answer */ trys=0;

do
    {
        say('P',903,YES);               /* ask caller to speak name*/ r=rcrd(4,0,5,1);    /* record, voice actuated, wait 4 seconds.
                               5 second time limit. stop on 1 second
                               of silence.*/ trys++;

}while(r==0 && trys<3);             /* prompt 3 times if no recording */ if(r==0)                            /* if no recording was made*/
    {
        m=0;
        goto bye;                       /* terminate the call */
    }
```

```
    itod(rcrdpos,&sdmsg.msgpos[0],5);   /* store memory position of end of name,
                                            beginning of message */ say('P',902,YES);                    /* say thank you */ trys=0;

do
    {
        say('P',904,YES);                /* say please speak your message */ r=rcrd(3,1,20,3);                /* record, voice act.,wait 3 seconds, limit
                                            20 secs, stop on 3 seconds of silence*/
        trys++;

}while(r==0 && trys<3);              /* prompt 3 times if no recording */ if(r==0)                             /* if no recording was made*/
    {
        m=0;
        goto bye;                        /* terminate the call */
    }
    else
        m=1;                             /* good message */ say('P',902,YES);                    /* say thank you */ bye:

if(hour<12)
        say('P',905,YES);                /* goodbye have a nice day */ else if (hour<18)
        say('P',906,YES);                /* goodbye have a good afternoon */ else
        say('P',907,YES);                /* goodbye have a good evening */ dial('*');                           /* transmit disconnect tone to phone */ onhook();                            /* hang up */ datetime(&sdmsg.date[0],&sdmsg.time[0]);  /* store the date and time */ if(m==1)                             /* if good message*/
        savsdmsg();                      /* save message to disk */
}                                        /* end of mpi routine */ end:

onhook();                            /* hang up */ enansr();                            /* enable modem auto answer */ return;                              /* terminate mpi program */
}

/* ---------------------------------------------------------------- */
            /* SPECIAL FUNCTIONS FOR MPI */

/* SAVSDMSG

Saves to disk the message which is resident in message memory. It will
be stored on the first message disk which has sufficient room. A unique
filename will be created, based on the current date and time. This is a
special delivery (temporary message) which does not belong to any particular
mailbox.

Form: savsdmsg()

Returns: nothing

Sets:

*/ savsdmsg()
```

```
{
    unsigned int dsk,i;

mkmsgnam('D');                                  /* creates filename for message */ dsk=MSG3;                                       /* select message disk */ itod(0,&sdmsg.trys[0],2);                       /* set delivery attempts to zero */ itod(sizeof(sdmsg),&sdmsg.data[0],4);           /* get size of data structure
                                                       in in character format*/

/* store msg structure in message*/ putstruc(&sdmsg,sizeof(sdmsg),msgmem[0],0);

/* write the message to disk */ do
    {
    cwrite(&msgnam[0],dsk,msgmem[0],0,endofmsg,0);  /* write to disk*/ dsk++;

}while(doserror!=OK && dsk<=sys.maxdisk);

return;
}
```

/*------------------------------------------------------------------*/
/* LDSDMSG

Loads the specified special delivery message from disk into the message
area in memory and copies the data into the sdmsg structure.

Form: ldsdmsg(disk,*msgname)

Where: msgname - a pointer to the ascii filename of the message disk - disk number Returns: nothing Sets: doserror
*/

```
ldsdmsg(disk,msgname)

unsigned int disk;

char *msgname;
{
    unsigned int i;

loadfile(disk,msgname,msgmem[0],0);             /* load message from disk */ if(doserror!=OK)                                /* if bad load, return */
        return;

can(&eof[0],&eof[1]);                           /* trim to even paragraph */ endofmsg=eof[0];                                /* set endofmsg */

/* copy data into msg structure */ getstruc(&sdmsg,sizeof(sdmsg),msgmem[0],0);

return;
}
```

/*------------------------------------------------------------------*/
/* DELIVER

Searches for messages requiring outcall, based on the date and time indicated
by the message file name and makes one call. If the call is succesful, the
message is delivered then deleted. If not sucessful, the number of attempts is updated and the message is renamed based on the current time. If the number of attempts exceeds the value of 'trys' the message is deleted.

```
        Form: deliver(trys, intervl)
        Where: maxtrys - number of times to attempt to deliver
               interval - number of minutes to wait before trying again
        Returns: nothing
*/ deliver(maxtrys,intervl)

unsigned int maxtrys,intervl;
{
unsigned int disk,ct,r,found,ent,nxent,i,n,ofst;

if(ringing()==TRUE)              /* if incomming call, abort procedure */
    return;

mkmsgnam('D');    /* make a filename, based on the current date and time */ ct=dtoi(&msgnam[3],4);           /* convert the four least significant
                                    digits of minutes to an integer */

/* subtract (intervl*line number) minutes*/ if(ct >= (intervl*port.num)
    ct-=(intervl*port.num);

/* search message disks for a message to deliver*/ disk=MSG3;
found=FALSE;

mkdnam(&msgnam[0]);              /* convert the filename to directory format */
do
{
    arbit();                                    /* reserve the disk */
    lddir(disk);                                /* load the directory */
    nxent=1;

/* search the directory for messages to deliver */ while((ent=dfind(&dnam[0],dire[disk],1,nxent)) <0xffff)
    {
        nxent=ent+1;
        ofst=(32*ent)+3;             /* start with 4th char of filename */ n=0;
        for(i=0; i<4; i++)
            n=10*n+readmem(dosmem,ofst+i)-'0';       /* convert to integer */ if(n<=ct)                    /* if older than the search time */
        {
            ofst=ent*32;

if(ringing()!=FALSE)    /* if incomming call, abort procedure */
            {
                relarb();
                return;
            } store(dosmem,ofst,'R');                 /* reserve the file */ for(i=0; i<8; i++)             /* store the name in msgnam[] */
                msgnam[i]=readmem(dosmem,ofst+i);

for( ; i<11; i++)          /* store the extension in msgnam[] */
                msgnam[i+1]=readmem(dosmem,ofst+i);

savdir(disk);                /* write directory back to disk*/
            found=TRUE;
            break;
        }
    }
    relarb();                                /* release the disk reservation */ if(found==FALSE)        /* if no deliveries required, go to next disk */
    {
        disk++;
    }
```

```
}while(found==FALSE && disk<=sys.maxdisk);
if(found==FALSE)                              /* if nothing found, return */
    return;
ldsdmsg(disk,&msgnam[0]);                     /* load the message from disk */
if(doserror!=OK)                              /* if bad load, try again */
{
    delay(1000);                              /* wait one second */
    ldsdmsg(disk,&msgnam[0]);                 /* try again */
    if(doserror!=OK)                          /* if still bad, abort procedure */
        return;
}
n=dtoi(&sdmsg.trys[0],2);                     /* update the number of times called */
n++;
itod(n,&sdmsg.trys[0],2);
r=outcall(&sdmsg.dial[0],32,908);             /* make the call, if answered say this
                                                 is a message from */
if(r==0)                                      /* if answered */
{
    i=endofmsg;                               /* save endofmsg */
    endofmsg=dtoi(&sdmsg.msgpos[0],5);        /* set to play back name */
    saymsg(0,0);                              /* speak the name */
    endofmsg=i;                               /* set to play back message */
    delay(2000);                              /* pause 2 seconds */
    saymsg(0,1);                              /* say message */
    goodbye(905,906,907);                     /* say goodbye */
    onhook();                                 /* hang up */
    delmsg(disk,&msgnam[0]);                  /* erase the message */
}
else                                          /* if not answered */
{
    onhook();                                 /* hang up */
    delmsg(disk,&msgnam[0]);                  /* erase the message from disk */
    if(n<maxtrys)                             /* if more calls are required */
        savsdmsg();  /* save message with filename based on current time */
}
return;
}

/* --------------------------------------------------------------------- */
```

Although the invention has been described in detail, the same is by way of illustration and example only and is not to be taken by way of limitation, the spirit and scope of the invention being limited only to the terms of the appended claims.

I claim:

1. A method for receiving and delivering voice messages over a telephone system having a voice message facility connectible to one or more calling stations and a called station via a central office, comprising the steps of:

(a) receiving and storing a called number at a calling station, the called number identifying the called station;

(b) transmitting the called number from the calling station to the central office via a trunk to initiate a call to the called station;

(c) evaluating whether the called station remains on-hook for a predetermined number of rings or is busy;

(d) if the called station remains on-hook for a predetermined number of rings or is busy, disabling a handset of the calling station and disconnecting the call from the trunk to prevent access to the voice message facility via the handset;

(e) speed-dialing the voice message facility from the calling station while the handset is disabled;

(f) reactivating the handset when the voice message facility goes off-hook and then automatically inquiring whether the caller at the calling station desires to record a voice message for the called station;

(g) if the caller desires to record a voice message for the called station, recording the voice message and the called number at the voice message facility;

(h) evaluating whether a predetermined number of attempts to deliver the recorded voice message to the called station have been made;

(i) if a predetermined number of attempts to deliver the recorded voice message have not been made, transmitting the called number from the voice message facility to the central office to initiate a call to the called station;

(j) evaluating whether the called station remains on-hook for a predetermined number of rings or is busy;

(k) if the called station goes off-hook within the predetermined number of rings, automatically transmitting the recorded voice message from the voice message facility to the called station; and (l) if the called station remains on-hook for a predetermined number of rings or is busy, repeating steps (j)-(l) until the predetermined number of attempts to deliver the recorded voice message have been made.

2. The method for receiving and delivering voice messages as described in claim 1 wherein the step of recording the voice message and the called number includes the step of:

storing the voice message and the called number in a call queue of the voice message facility, the call queue having a plurality of addressable storage locations.

3. The method for receiving and delivering voice messages as described in claim 2 wherein step (i) includes the steps of:

retrieving the recorded voice message from the call queue;

determining whether the voice message facility has an available access port from which the recorded voice message can be delivered to the called station;

if the voice message facility does not have an available access port from which the recorded voice message can be delivered to the called station, storing the recorded voice message in a subqueue of the voice message facility at a predetermined position;

retrieving the recorded voice message from the subqueue when the voice message facility has an available access port from which the recorded voice message can be delivered to the called station; and transmitting from the available access port the called number associated with the recorded voice message prior to retrieving another recorded voice message from the call queue.

4. A method for receiving and forwarding voice messages over a telephone system having a voice message facility connectible to one or more calling stations and a called station via a central office, comprising the steps of:

receiving and storing a called number identifying the called station;

transmitting the called number from the calling station to the central office via a trunk to initiate a call to the called station;

evaluating whether the called station remains on-hook for a predetermined number of rings or is busy;

if the called station remains on-hook for a predetermined time or is busy, disabling the handset of the calling station and is connecting the call from the trunk to prevent unauthorized access to the voice message facility via the handset;

speed-dialing the voice message facility while the handset is disabled;

reactivating the handset when the voice message facility goes off-hook and then automatically inquiring whether the caller at the calling station desires to record a voice message for the called station; and if the caller desires to record a voice message for the called station, connecting the calling station to the voice message facility and transmitting the called number thereto.

* * * * *